May 27, 1958   L. A. M. PHELAN   2,836,401
FREEZER SCRAPER BLADE AND MOUNTING THEREFOR
Filed Aug. 16, 1956
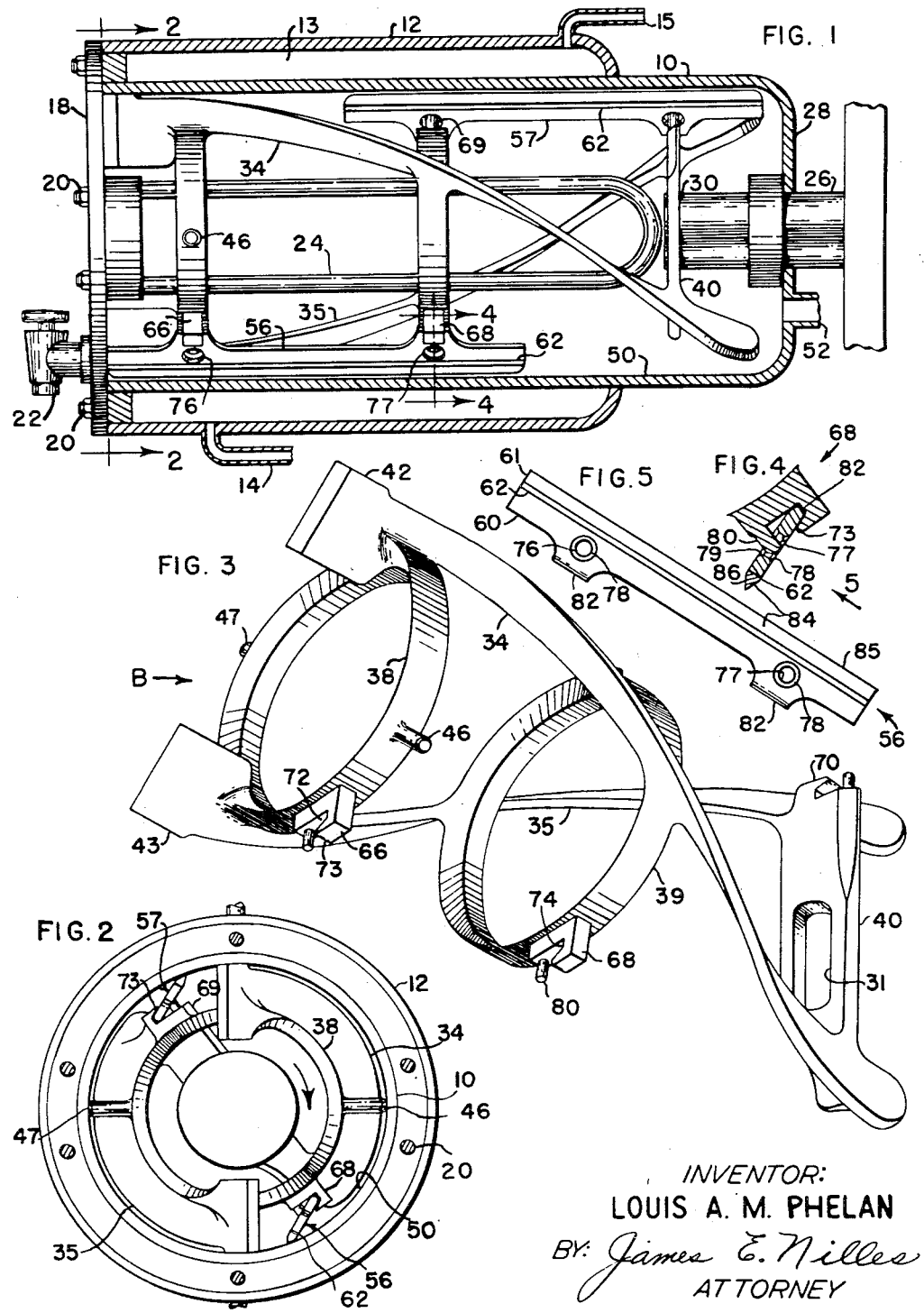
INVENTOR:
LOUIS A. M. PHELAN
BY: James E. Nilles
ATTORNEY United States Patent Office 2,836,401
Patented May 27, 1958

2,836,401

FREEZER SCRAPER BLADE AND MOUNTING THEREFOR

Louis A. M. Phelan, Rockton, Ill.

Application August 16, 1956, Serial No. 604,482

6 Claims. (Cl. 259—109)

This invention relates generally to freezing mechanisms for ice cream, custards and the like, wherein the fresh mix is fed into one end of a refrigerated cylinder and a rotary beater mixes, aerates and discharges the material at the other end of the cylinder as an edible frozen product. More specifically the invention concerns the scraper blades and their mounting to the beater which are required to keep the inner wall of the cylinder free of frozen material. Good scraper blade performance is vital to fast and efficient freezer operation.

It is an object of this invention to provide an improved scraping means for a beater of a freezing cylinder which will keep the inner wall of the cylinder free of frozen material to insure continuous unobstructed flow of the mix through the freezer, give long life to the cutting edge, minimize wear on the freezer wall and prevent damage to any of the parts.

It is another object of the invention to provide an improved scraper blade for a beater of a freezing cylinder, said blade being completely reversible thus insuring proper assembly and positioning and eliminating chatter, gouging or other damage, resulting generally in quiet operation.

It is another and important object of the invention to provide a bimetal scraper blade for a freezer which minimizes galling and corrosion of either the cylinder wall or blade and is sufficiently ductile to have the requisite tensile strength to permit the blade to bend and flex.

Other objects and advantages will become more apparent from the following detailed description, taken in conjunction with the attached sheet of drawings in which, by way of preferred example only, is illustrated the invention.

In the drawings:

Figure 1 is a side elevational view in section showing a freezer employing the improved scraper mechanism.

Figure 2 is a front end elevational section taken on line 2—2 of Figure 1.

Figure 3 is a perspective view of the beater shown in Figure 1, but on an enlarged scale, and showing the scraper blade mounting brackets.

Figure 4 is a sectional view taken on line 4—4 of Figure 1, but on an enlarged scale, showing the mounting bracket with the blade in the operative position.

Figure 5 is a view of a scraper blade taken generally in the direction of arrow 5 in Figure 4.

Referring in greater detail to the drawings, the freezer cylinder 10 has an outer jacket 12 which forms an annular passage 13 to which refrigerant is introduced by conduit 14 and removed from by conduit 15. A front cover plate 18 is removably secured by bolt means 20 and has a serving valve 22 adjacent its lower end. A retarder 24 is rigidly secured to the cover plate for removal therewith and extends into the central portion of the cylinder 10.

A beater B is rotatably mounted within the cylinder and is driven by the shaft 26 extending through the rear wall 28 of the cylinder. The end 30 of the shaft is non-circular in cross section and fits the mating aperture 31 in the rear of the beater for driving engagement therewith. Shaft 26 thus forms an accurate bearing for the rear end of the beater. The beater is of generally elongated and cylindrical shape and includes two helical screws 34, 35 located on diametrically opposite sides of the beater and generally defining the length of the beater. The screws are rigidly joined to a pair of axially spaced, transversely positioned rings 38, 39 and also to a rear member 40, as by welding. The front end of the beater is accurately located and supported for rotation within the cylinder 10 by circumferentially spaced bearing surfaces including the radial projections 42, 43 on the front ends of screws 34, 35 and the ends of posts 46, 47 which are welded to front ring 38 and extend radially therefrom. These four bearing surfaces are located on a common radius of the beater and form a running fit with the inner wall 50 of the freezer cylinder 10. Thus the front end of the beater is also accurately located concentrically with the cylinder 10, but there is sufficient space between the bearing surfaces and the inner wall to prevent binding. This clearance is necessary to accommodate any out-of-roundness of the cylinder which may be present. For this reason the rigid screws themselves cannot contact the inner wall 50.

Fresh mix is introduced into the refrigerated shell or cylinder 10 through conduit 52 whereupon the beater commences to process it by thorough mixing, whipping air into it, and moving the mix toward the front of the cylinder by the auger action of the screws 34, 35. The retarder 24 serves to create the necessary turbulence by preventing the material from simply rotating bodily around inside the shell.

One of the most troublesome problems in devices of this type is the formation of frozen material on the inner wall 50 of the cylinder. For example, ice readily forms on this wall and tends to build up thereon, and one of the major functions of beaters of this general class is to keep the inner wall completely free of ice. A considerable cutting force is required to remove this ice from the wall.

The beater is positively driven by a source of power and it is essential to keep it accurately centered within the cylinder and prevent any misalignment between the relatively moving surfaces. The cylinder however, is not always exactly round but often is slightly oval in cross section, as before mentioned. In order to keep the cylinder inner wall completely clear of frozen matter, the scraper blades 56, 57 are so mounted, as will appear, to enable them to freely follow the contour of the inner wall, yet at the same time they are rigidly held in cutting position to overcome the resistance offered by the frozen material on the wall.

The freezer cylinder 10 as well as the beater and other parts on the inside of the cylinder are made of stainless steel. The inner wall 50 of the cylinder is honed to produce a mirror-like finish. By presenting an extremely fine finish to the scraper blades, galling of the inner wall and of the blade itself has been reduced substantially but has not been entirely eliminated. This galling of the wall and blade has also been a troublesome problem because, once started, the galling condition is aggravated and can cause the cutting edge of the blade to seize, thereby hinging backwardly and scoring the wall.

In conventional freezer-scraper mechanisms, the scraper blades have been made of softer material than the cylinder, which permitted the blade to wear at a greater rate than the cylinder thereby minimizing scoring of the cylinder. In other words, it was thought preferable to use a soft lubricating blade, one that would wear rapidly and be replaced, rather than one that scored the cylinder, which is difficult and costly to replace.

In accordance with this invention a scraper blade has been provided which has a harder cutting edge than the cylinder material and has a negligible wear factor so as to remain sharp. By insuring that the blade remains sharp and does not change in size, it maintains its proper angle of attack to cut the frozen material rather than merely scrape or rub over the iced mass on the cylinder wall. Stated otherwise, with the blade and mounting of the present invention, a good angle of attack is provided and maintained which is especially important, when using a harder-than-cylinder cutting edge. In this manner the proper cutting action is insured, thus preventing the edge to simply slide over the ice or, on the other hand, seize and thereby score. The desirable angle of attack varies, depending on the hardness of the frozen confection, which in turn depends on the temperature, ingredients used and their lubricating value. It has been found that this angle should be in the range of 27 to 39 degrees, measured from the tangent line of the point being scraped.

As best shown in Figures 4 and 5 the elongated and relatively narrow blade is made of two different parts 60, 61, each part being of different metal and welded together generally along the joint 62. The base portion 60 of the blade is made from stainless steel. The blade must have sufficient flexibility to enable it to bend and flex to a certain extent in cutting away the ice. The stainless steel is sufficiently ductile, or soft, to permit the necessary flexing without fracturing. The cutting edge portion 61 of the blade is formed of a very hard metal as compared to the cylinder wall. It is not enough however, to simply make the cutting edge of harder material than the cylinder, but experience has shown an entirely different metal than that of the cylinder wall is required for best results. For example, one metal that has been found satisfactory has a chemical composition consisting mostly of copper, 12.6–13.4 percent aluminum, 3.5–5.0 percent iron and a maximum of 0.5 percent other material. This bimetal blade has the required flexibility to prevent fracturing and the hard cutting edge of material different than the cylinder wall to prevent galling.

The scraper blades are mounted on the peripheral portions of the beater formed by rings 38, 39 and the rear member 40. The blades are positioned in alignment with the axis of rotation and the number of blades employed, their spacing or length may be variable.

The mounting means for the blades include brackets 66 and 68, 69 secured by welding to rings 38, 39, respectively. A similarly shaped bracket 70, shown best in Figure 3, is formed integrally with rear member 40, but the manner of fastening these mounting brackets rigidly on or adjacent the beater periphery may be varied. As indicated by the curvilinear arrow in Figure 2, the beater rotates in the clockwise direction. The mounting brackets have an opening or slot 72 facing forwardly in respect to the direction of beater rotation, the slot being formed by a forwardly extending projection 73. The rear wall portion 74 defines the rear of the slot against which the rear edge 82 of the blades is pressed during the ice scraping process, as shown best in Figure 4. The blades 56, 57, have means for mounting to the beater including a pair of apertures 76, 77, having similarly beveled edges 78, 79. Apertures 76, 77 are adapted to slip loosely over the radially extending projection or post portions 80 of the mounting brackets and in the cutting position the posts are located in the center of their respective apertures and out of contact with the blade. Therefore, in operation the rounded rear load-bearing edges 82 of the blade bear tightly against rear wall 74 and the radial projections or posts 80 in no way impede the swinging or pivotal movement of the blade about its rear edge. As a result the blade is free to follow the contour of the inner wall 50 and the cutting edge is tightly held against the thrust-carrying wall 74 by the material being scraped. Centrifugal force also swings the blades into contact with the wall. While being held firmly in cutting position the blade is still free to flex and twist as required, but is prevented from axial shifting by the posts 80.

The overhanging radially outer projection 73 of the brackets holds the blade in loosely assembled relationship with the beater while the latter is inoperative. To remove the blade it is only necessary to first slide it forwardly in the slot (toward post 80) and then raise it clear of the post, thereby providing a simple means of assembly and disassembly.

It will be noted the blade is symmetrical in shape along a plane passing through its length and containing its major cross-sectional axis. Stated otherwise, the beveled edges 84, 86 which form its cutting edge 85 are identical, as are the beveled edges 78, 79 of its apertures. The rear edge 82 is also symmetrically about said plane and forms an accurate seat for the blade regardless of which side of the blade faces away from the beater. In either position the round rear edge 82 forms an accurate and firm pivot point for the blade.

In addition, the spacing of the apertures 76, 77 along the blade length, i. e., from its ends, is such that the blade is reversible end for end. This is important from a practical standpoint as it precludes improper assembly in the field. Otherwise a conventional blade may through inadvertence, accident or mistake be assembled in the wrong position and experience has shown this to be highly disastrous. For instance, in addition to severe wear, galling and scratching, binding between the moving surfaces occurs which frequently results in complete distortion and mangling of the beater.

It should be understood that it is not intended to limit the invention to the above described forms and details, and that the invention includes such other forms and modifications as are embraced by the scope of the appended claims.

I claim:

1. In combination with a cylindrical freezer, a beater rotatably mounted in said freezer, said beater having mounting brackets secured thereto; an elongated and reversible scraper blade having a double beveled scraping edge portion of relatively hard metal as compared to said freezer so as to prevent galling, a base portion of softer metal which permits flexing of said blade within limits and without fracture; said base portion having means for loosely mounting said blade to said brackets.

2. In combination with a cylindrical freezer, a beater rotatably mounted in said freezer, said beater having mounting brackets secured thereto including projections; an elongated and reversible scraper blade having a double beveled scraping edge portion of relatively hard metal as compared to said freezer so as to prevent galling, a base portion of softer metal which permits flexing of said blade within limits and without fracture; said base portion having apertures adapted to engage said projections for loosely mounting said blade to said brackets.

3. In combination with a cylindrical freezer, a beater rotatably mounted in said freezer, said beater having mounting brackets secured thereto; an elongated and reversible scraper blade having a double beveled scraping edge portion of relatively hard metal as compared to said freezer so as to prevent galling, a base portion of softer metal welded to said scraping edge portion which permits flexing of said blade within limits and without fracture; said base portion having means adapted to engage said brackets for loosely mounting said blade thereon.

4. In combination with a cylindrical freezer, a beater rotatably mounted in said freezer, said beater having mounting brackets secured thereto including projections; an elongated and reversible scraper blade having a double beveled scraping edge portion of relatively hard metal as compared to said freezer so as to prevent galling, a base portion of softer metal which permits flexing of said blade within limits and without fracture; said base portion having apertures adapted to engage said projections for loosely mounting said blade to said brackets and a rounded thrust absorbing edge on the side of said blade opposite to said scraping edge, said round edge forming a pivot surface for said blade.

5. In combination with a cylindrical freezer, a beater rotatably mounted in said freezer, said beater having mounting brackets secured thereto; an elongated scraper blade having a beveled scraping edge portion of relatively hard metal as compared to said freezer so as to prevent galling, a base portion of softer metal which permits flexing of said blade within limits and without fracture; said base portion having means for loosely mounting said blade to said brackets.

6. In combination with a cylindrical freezer, a beater rotatably mounted in said freezer, said beater having mounting brackets secured thereto including projections; an elongated scraper blade having a beveled scraping edge portion of relatively hard metal as compared to said freezer so as to prevent galling, a base portion of softer metal which permits flexing of said blade within limits and without fracture; said base portion having apertures adapted to engage said projections for loosely mounting said blade to said brackets and a rounded thrust absorbing edge on the side of said blade opposite to said scraping edge, said round edge forming a pivot surface for said blade.

References Cited in the file of this patent

UNITED STATES PATENTS

| | | |
|---|---|---|
| 2,211,387 | Routh | Aug. 13, 1940 |
| 2,283,487 | Boileau | May 19, 1942 |
| 2,289,613 | Weinreich | July 14, 1942 |
| 2,408,790 | Mack | Oct. 8, 1946 |
| 2,664,586 | Prins et al. | Jan. 5, 1954 |
| 2,689,113 | Merrill | Sept. 14, 1954 |